G. A. & S. A. DOBYNE.
FASTENER INSERTING MACHINE.
APPLICATION FILED OCT. 8, 1912.
1,091,298.
Patented Mar. 24, 1914.
5 SHEETS—SHEET 4.
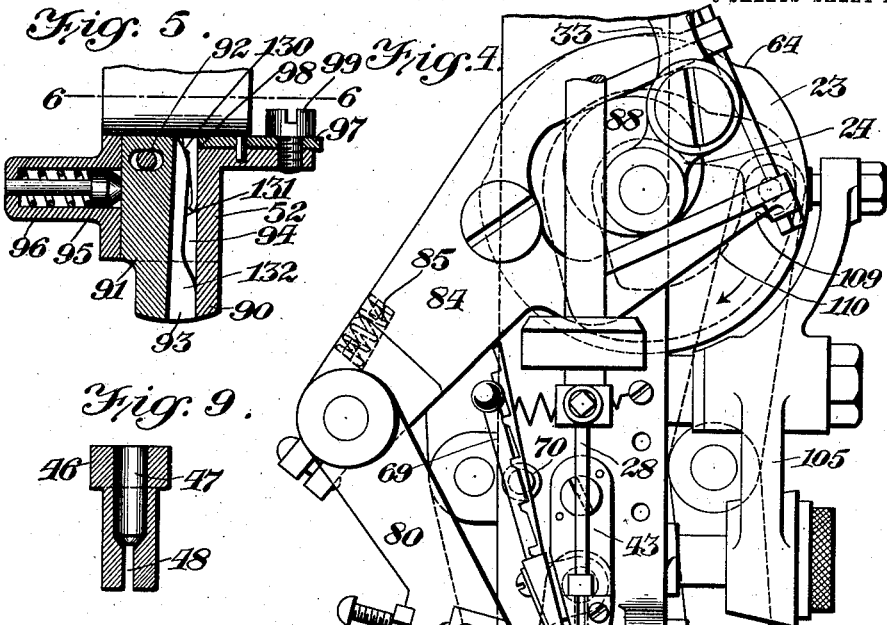
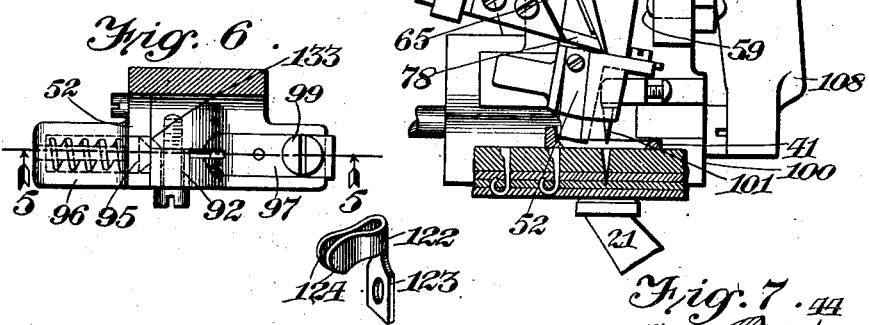
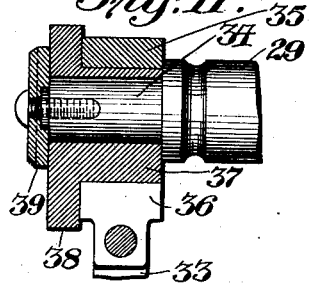
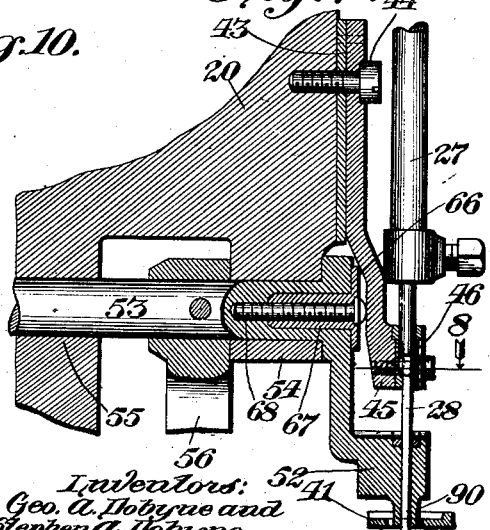
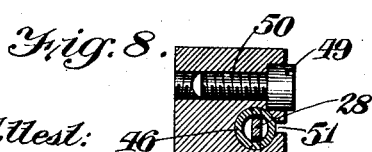
Attest:
Chas A. Becker
O. J. Groebl Jr.
Inventors:
Geo. A. Dobyne and
Stephen A. Dobyne,
by John H. Bruninga,
Their Attorney.

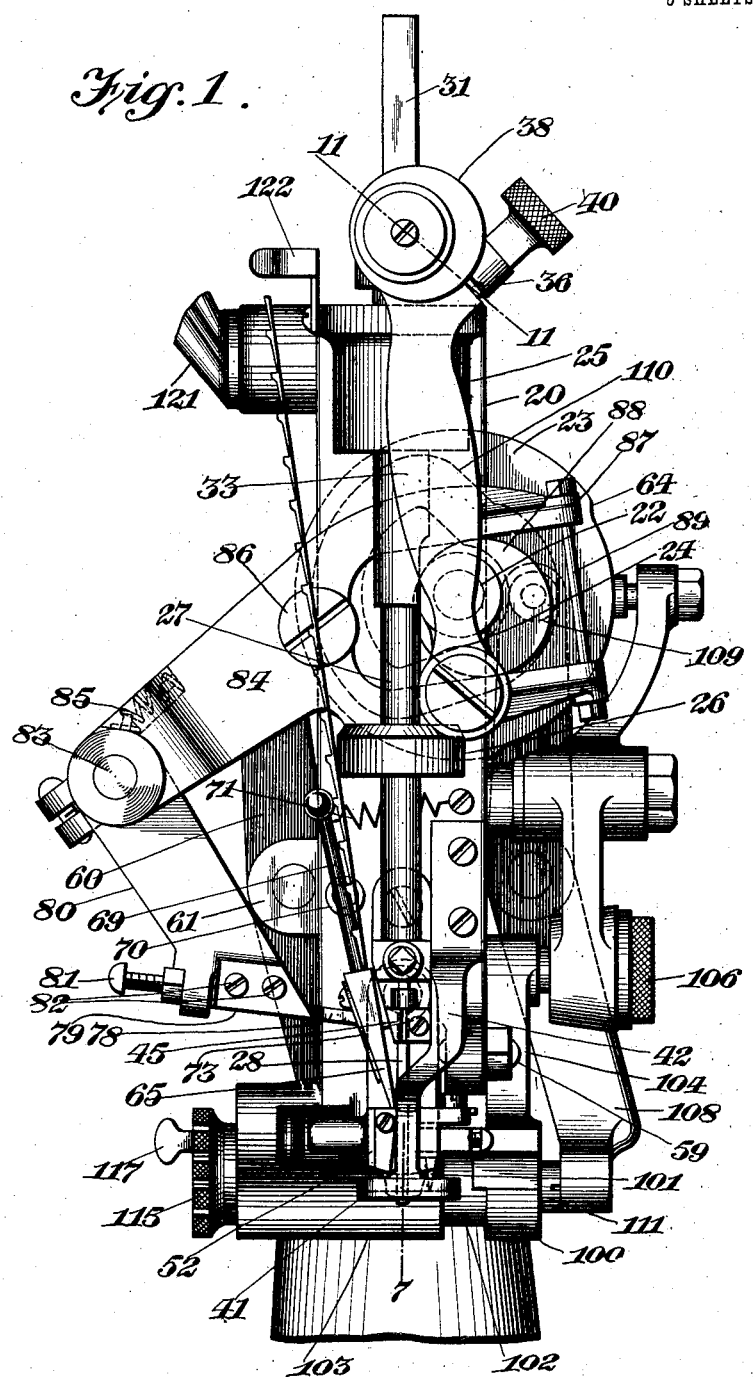

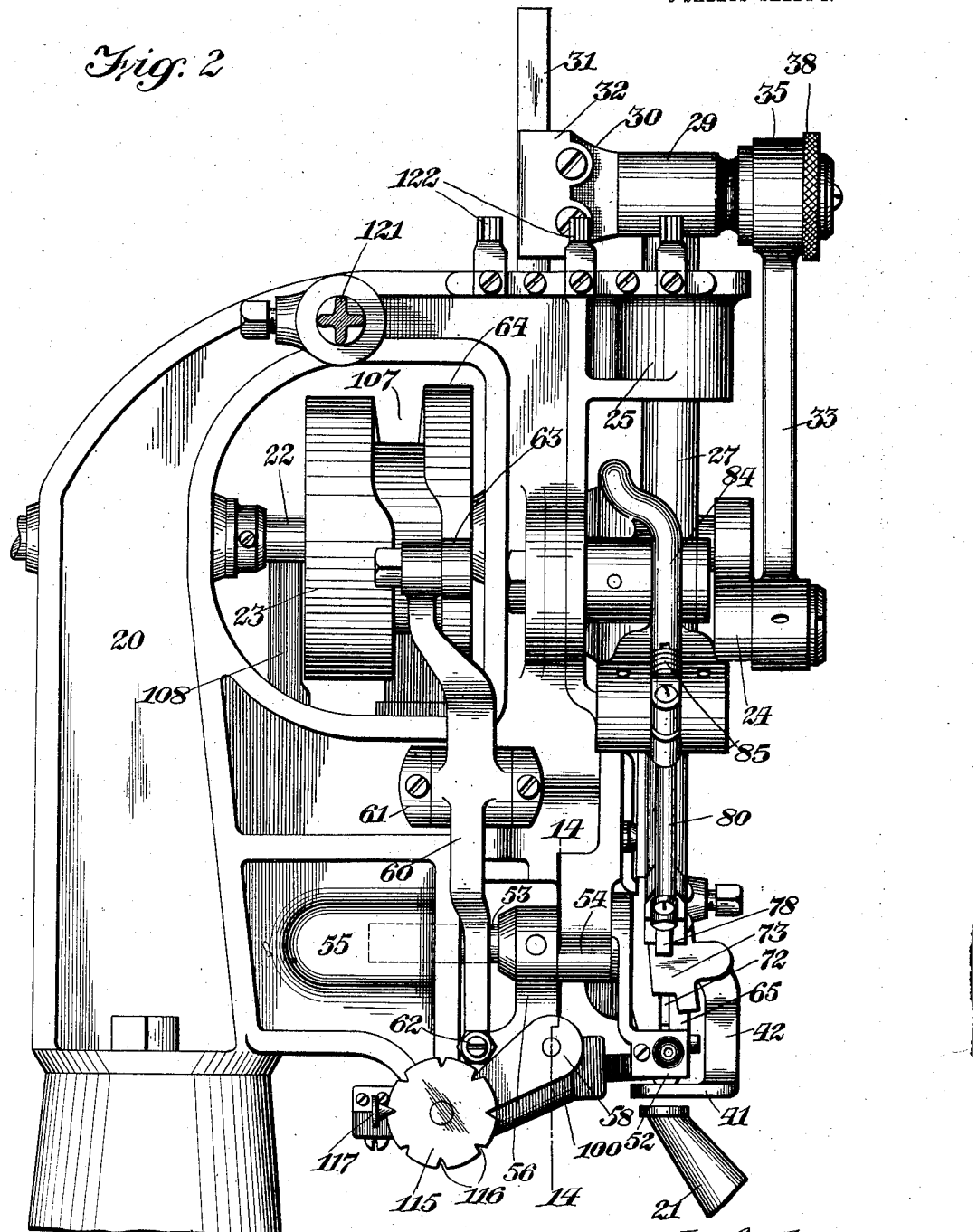

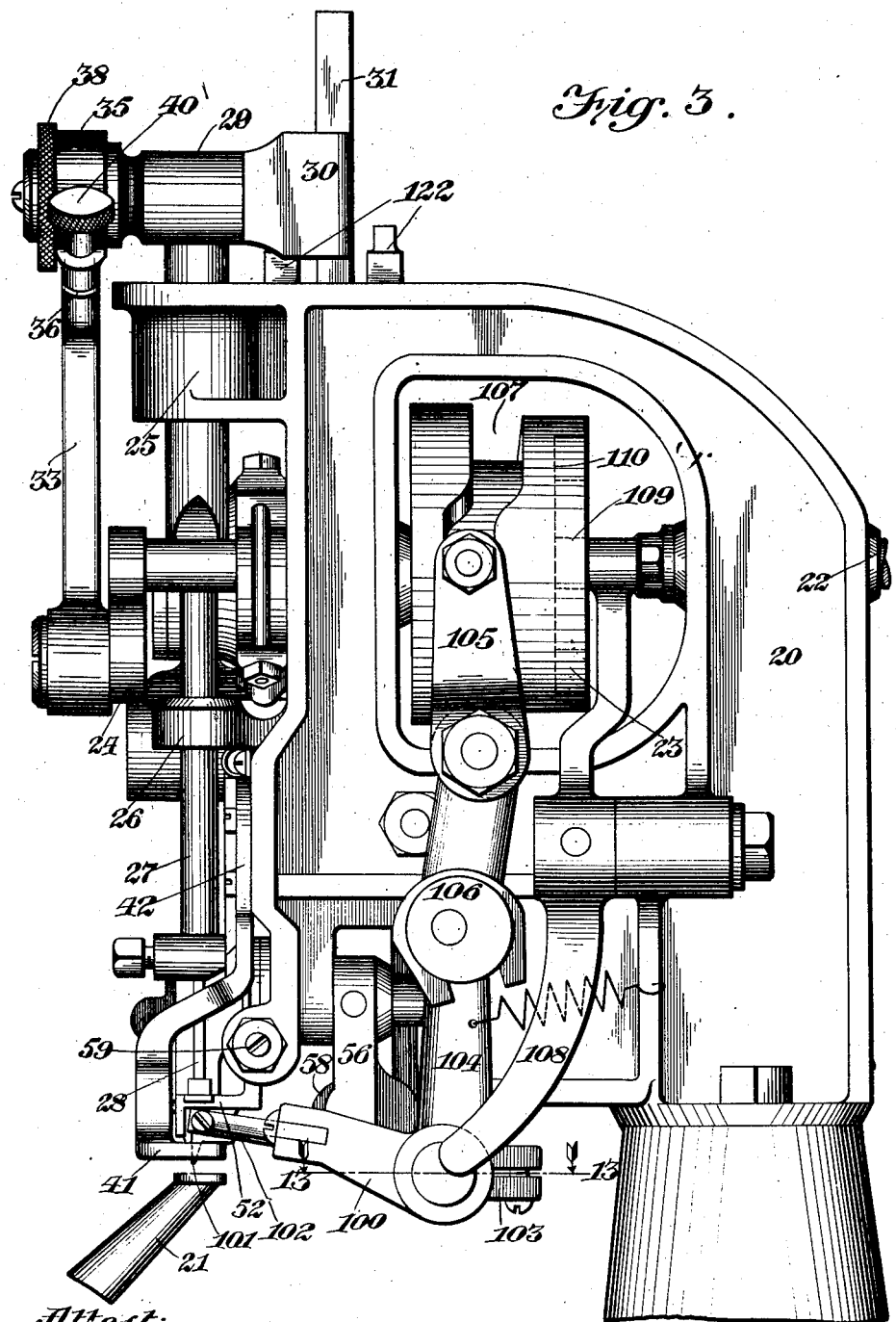

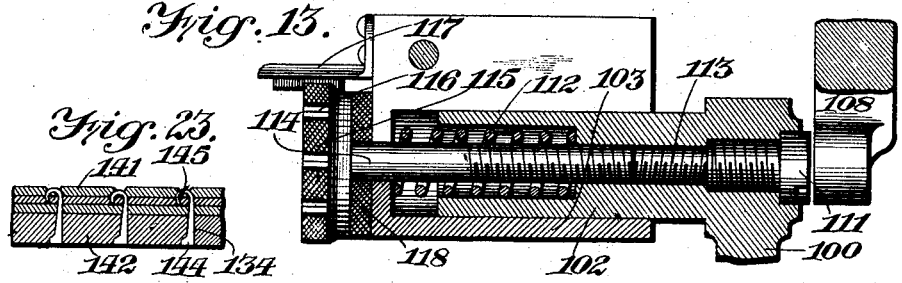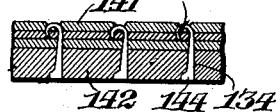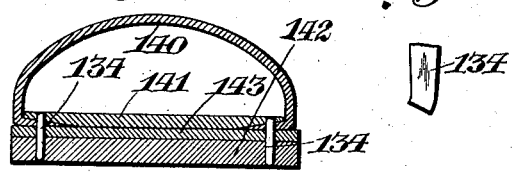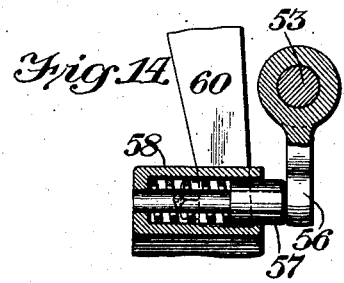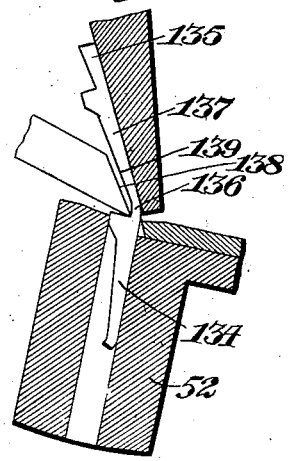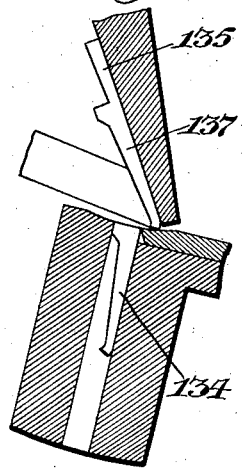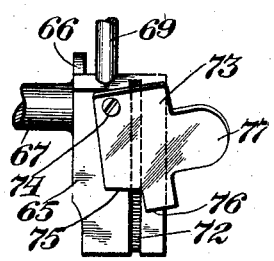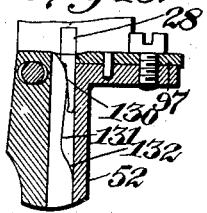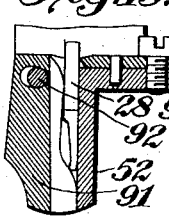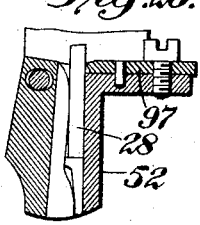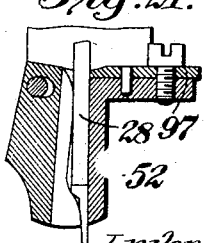

UNITED STATES PATENT OFFICE.

GEORGE A. DOBYNE AND STEPHEN A. DOBYNE, OF ST. LOUIS, MISSOURI, ASSIGNORS TO CHAMPION SHOE MACHINERY COMPANY, OF ST. LOUIS, MISSOURI, A CORPORATION OF MISSOURI.

FASTENER-INSERTING MACHINE.

1,091,298. Specification of Letters Patent. Patented Mar. 24, 1914.

Continuation of application Serial No. 593,357, filed November 21, 1910. This application filed October 8, 1912. Serial No. 724,680.

*To all whom it may concern:*

Be it known that we, GEORGE A. DOBYNE and STEPHEN A. DOBYNE, citizens of the United States, and residing at St. Louis, in the State of Missouri, have invented certain new and useful Improvements in Fastener-Inserting Machines, of which the following is a specification.

This invention relates to fastener inserting or nailing machines, and more particularly to machines of the class known as "string nailing machines".

This application is a continuation of our application Serial No. 593357, filed Nov. 21, 1910 as to subject matter which is common to the two applications.

Where a string nailing machine is to be used for forming a seam, for instance a seam for attaching a sole to a shoe, it is necessary to provide such a machine with an awl and with work feeding mechanism. It is necessary that the awl and the throat be moved alternately into the line of drive, in order to properly position the awl hole made in the work to receive the fastener. It is important that the string of connected nails be properly fed into the throat and that the lowest nail be properly severed from the string so that the head will be cut off square and clean.

One of the objects of this invention therefore is to construct the machine so that the string will be properly and accurately fed into the movable throat, and so that the nail will be properly severed from the string so as to form a square cut head.

In a McKay shoe, a transverse section of which is shown in Fig. 22, the fastening means passes through the outsole, upper and insole, and sometimes through a tapsole located between the upper and insole. Heretofore the sole of a McKay shoe was attached by a sewed seam. The McKay sewing machine used for performing this operation is however, a very complicated machine and requires for its operation skilled and highpriced operators. An objectionable feature of the McKay sewed seam (which is a chain stitch seam) is due to the fact that it leaves the projecting chain on the insole, and the shoe therefore requires a socksole to cover up this seam. Various methods have been proposed for securing the sole of a McKay shoe by a metallic fastener seam, but without success. The seam in a McKay shoe should run close to the contour of the sole, and therefore as close to the inside face of the upper as possible, in order to make a tight seam which will present a neat appearance. Where a metallic fastener seam is used, it is desirable and necessary that the points of the fasteners clenched in the insole extend along the seam. This requires that the clenching means be constructed so as to clench the points in a predetermined direction. If the clench is not predetermined, then the point may turn outwardly and pass through the upper and ruin the shoe. In order to secure a flexible sole, the fibers at the outer face of the outsole must be free to expand and contract when the sole is flexed. A staple fastener or a fastener having a pronged or depending head is therefore unsuitable, since it does not permit such free expansion and contraction and does not therefore permit unobstructed flexing of the sole.

Another object of this invention therefore is to construct a machine which will form a seam producing a flexible sole, and to provide means for absolutely predetermining the direction of the clench of the fastener, so that the fasteners of the seam may have their points clenched in the direction of the seam.

Another object is to provide means whereby the throat will be operated positively in both directions, and to construct the guide for the fastener stock so as to insure a positive and accurate feed of the fastener stock.

Another object is to provide a positive and direct driving means for the driver, the driver bar, and the awl, and to provide means for the accurate adjustment of said members.

Another object is to improve the machine as to certain details of construction, and further objects will appear from the detail description taken in connection with the accompanying drawings in which:

Figure 1 is a front elevation of a machine head embodying this invention, Fig. 2 is a side elevation of the left-hand side of the machine, Fig. 3 is a side elevation of the right-hand side of the machine, Fig. 4 is a view similar to Fig. 1, but showing the mechanism in another position, Fig. 5 is a section on the line 5—5 Fig. 6, Fig. 6 is a section on the line 6—6 Fig. 5, Fig. 7 is a section on the line 7 Fig. 1, Fig. 8 is a section on the line 8 Fig. 7, Fig. 9 is a vertical section of the driver guide sleeve, Fig. 10 is a detail perspective view of one of the fastener stock holding clips, Fig. 11 is a detail section on the line 11—11 Fig. 1 showing the driver adjustment, Fig. 12 is a perspective view of the die, Fig. 13 is a section on the line 13—13 Fig. 3, Fig. 14 is a section on the line 14—14 Fig. 2, Fig. 15 is a detail of the fastener stock guide, Figs. 16 and 17 are diagrammatical views illustrating the operation of the machine in cutting off a fastener and forming the point thereon, Figs. 18, 19, 20 and 21 are diagrammatical views illustrating the mechanism for guiding the fasteners while being driven, Fig. 22 is a transverse section of a McKay shoe showing the seam formed with the machine embodying this invention, Fig. 23 is a section along the seam, and Fig. 24 is an enlarged view of the point of the fastener as formed in this machine.

Referring to the accompanying drawings, 20 designates the machine head or frame, which is bolted upon a pedestal or column as is usual in machines of this type, and 21 designates a horn of usual construction provided with the usual cupped clenching anvil. A main drive shaft 22 is mounted in the head and has rigidly secured thereto a cam wheel 23 and at its forward end a crank 24. The machine is provided with spaced bearing lugs 25 and 26 positioned respectively above and below the drive shaft, and these lugs are bored to form bearings for a driver bar 27. A driver 28 is removably clamped in the driver bar by means of a set screw as shown in the drawings. The upper end of the driver bar is provided with a head 29 which has a rearward extension 30 forked to embrace a guide bar or post 31 on the machine head, one of the lugs 32 of the fork being adjustable as shown in Fig. 2 to take up wear. A pitman 33 connects the crank 24 with a bearing 34 on the head 29, the end 35 of the pitman being split as shown at 36. An eccentric sleeve 37 provided with a knurled head 38 is rotatively mounted in the end 35 and on the bearing 34, and is secured in position by means of a screw and washer 39. The split end of the connecting rod is arranged to be contracted to clamp the eccentric sleeve in adjusted position by means of a locking screw 40 having a knurled head. By means of this construction the driver may be adjusted vertically by first loosening the locking screw and then turning the eccentric sleeve, and the parts may then be locked in adjusted position by clamping the locking screw.

A presser-foot 41 slotted as shown in the drawings is provided with a shank 42 screwed to the head. A driver guide has a shank 43 secured to the head by means of a screw 44 and dowels as shown in Figs. 1, 4 and 7. The lower end of the shank has formed thereon a driver guide 45 which is bored to receive a sleeve 46 of novel construction and shown in detail in Fig. 9. The lower end of the driver is of rectangular construction and has its longest dimension transverse of the machine. The sleeve 46 is bored at 47 to receive the driver and is provided at its lower end with a saw cut 48 to furnish an angular guiding portion for the angular part of the driver. This construction of the sleeve reduces its cost of manufacture. The sleeve is secured in position as shown in Fig. 8 by means of a screw 50, the head 49 of which engages the sleeve and clamps it in position, and the front of the driver guide is slotted as shown at 51. The driver may be removed by loosening and raising the sleeve out of its support, loosening the driver, and then turning and removing the driver through the slot 51.

A throat 52 is provided with a shaft 53 supported in spaced bearings 54 and 55 on the machine head. An arm 56 is secured on this shaft and is engaged by a spring pressed plug 57 sliding in a bore 58 in the machine head, and this plug normally tends to rotate the shaft and throat to the right Figs. 1 and 4 into alinement with the driver and into engagement with a stop 59 on the machine head. A lever 60 is supported in bearings 61 on the machine head and is provided at its lower end with an adjustable set screw 62 engaging a laterally extending lug on the arm 56, and at its upper end with a cam roll 63 engaging the cam 64 on the cam wheel 23. The cam and lever operate to positively return the throat into alinement with the driver and into engagement with the stop 59.

A fastener stock guide 65 is provided with an ear 66 having a lug 67 thereon which has a bearing in a bore in the end of the shaft 53 so that the throat and the guide will move about concentric axes. The guide is secured in position by means of a screw 68 extending through the ear and lug and into the shaft 53. An arm or pin 69 is formed on the guide 65 and this arm is held in engagement with a stop 70 on the machine frame by means of a comparatively strong spring 71. The guide is provided with a groove 72 for receiving the string of connected nails. A resilient plate 73 is pivoted at 74 on the guide, and is provided with edge portions 75 and 76 of different lengths adapted to engage the heads of the nails. An ear 77 is formed on the plate so that the plate may be rotated about the screw 74 as an axis to throw either of the edges or portions 75 and 76 over the groove 72. The screw 74 is drawn up tight so that the plate will be held frictionally in either of its adjusted positions. The plate forms a guard or detent adapted to prevent backward movement of the string and for controlling the feed of the fasteners by the feeding and cutting member as hereinafter described. By adjusting this guard the machine may be adjusted for fasteners of different lengths.

A blade 78 sharpened at its end is mounted in the slotted end 79 of an arm 80. A set screw 81 bears against the end of this blade so that this blade may be adjusted in its arm, and it may be locked in adjusted position by means of clamping screws 82. The arm 80 is pivoted at 83 to one end of a lever 84, and a spring 85 is constructed to tend to move this arm in a counterclockwise direction (Fig. 1) on the lever. The lever 84 is pivoted at 86 upon the machine head, and is provided with a forked end 87 embracing an eccentric 88 on the drive shaft. A tie bolt 89 connects the ends of the fork.

The throat is provided with a depending portion 90 working in the slot in the presserfoot and is cut away or channeled at one side. A block or guide member 91 is pivoted in this cut away portion at 92, and this block is provided with a fin 93 which projects into the driver passage 94 and forms one wall of the driver passage. The block is held with its fin in the driver passage by a spring pressed plug 95 bearing against the block and mounted in a tubular bore of a part 96 secured to the throat. The upper face of the throat is provided with a removable cutting die 97 which is bowed as shown in Fig. 12 and has its notched cutting edge slightly beveled or undercut as shown at 98 Fig. 4. The upper face of the throat and die adjacent the driver passage is curved on the arc of a circle concentric with the throat pivot, and due to the fact that the guide is pivoted on the throat and concentric therewith, the nail will be cut off square, since the cut is substantially at right angles to the nail shank. The die 97 is clamped on the throat by a screw 99, and the bowed construction of the die will cause the die to be firmly clamped on the throat at its cutting edge.

An awl carrier 100 is provided with an awl 101 and has a shank 102 supported to rock and slide in a bearing 103 on the machine head. The awl carrier is rocked from the cam wheel 23 by an arm 104 on the carrier connected through a block 106 with the forked end of a lever 105 pivoted on the machine head, the upper end of the lever having a cam roll engaging a cam groove 107 in the cam wheel. The awl carrier is slid in its bearing by means of a lever 108 pivoted on the machine head and provided at its upper end with a cam roll 109 engaging a face cam groove 110 in the cam wheel. The lower end of the lever 108 engages the awl carrier through a screw 111 which is adjustably mounted in the end of the awl carrier as shown in Fig. 13 and is for this purpose provided with a slotted head. A spring 112 is mounted in the bearing 103 and between the end of the bearing and the hollow shank 102, and this spring tends to move the awl carrier to the right Figs. 1, 4 and 13. The awl carrier shank is threaded as shown at 113 to receive the threaded shank 114, which extends through the end of the bearing 103, and is provided with a knurled head 115. The threaded shank 114 is arranged to be adjusted by means of the knurled head, and this head is provided with notches 116 arranged to be engaged by a yielding latch 117 mounted on the bearing 103. A leather washer 118 is interposed between the knurled head and the end of the bearing 103. The awl carrier is operated from the cam wheel through its levers, and it will be noted that these levers are operated positively in both directions. The carrier is slid in its bearing by means of the lever 108 and is returned by means of the spring 112. Its return movement is however limited by the engagement of the knurled head with the end of the bearing, the washer 118 forming a cushion to take up the impact. The feed of the awl may therefore be adjusted by adjusting the knurled head, and the latch is long enough so that it will remain in engagement with the knurled head during its sliding movement with the awl carrier. The awl may be properly alined with the line of drive by adjusting the screw 111.

The fastener stock, which is in string nail form, is supported from one or more reels mounted by means of a bracket 121 on the machine head. In order to support the free ends of the fastener stock not in use, the machine head has mounted thereon a plurality of clips 122. One of these clips is shown in detail in Fig. 10, and comprises a shank 123 and a pair of lugs 124 flaring outwardly. The whole clip is preferably made of sheet metal and the lugs thereof are yielding and may be spread apart to receive the end of the fastener stock when not in use and retain it yieldingly therein.

The operation of the machine so far described is as follows: The awl carrier is swung to cause the awl to pierce the work by means of the lever 105, and is slid to feed the work by means of the lever 108, the awl when in the work being moved into alinement with the driver to position the awl hole in the line of drive. During the feeding movement of the awl, the throat is moved out of the line of drive by the engagement of the awl carrier therewith, the awl carrier engaging the throat and swinging it to the position shown in Fig. 4, the cam roll 63 being at this time on the low part of the cam 64 to permit such movement. As the throat moves from the position shown in Fig. 1 to the position shown in Fig. 4, the feeding and cutting member 78 moves down and feeds the string of nails into the throat, thereafter the feeding and cutting member is moved to the right Figs. 1 and 4 to cut off the lowermost nail from the string, and thereafter the throat is moved to the right to the position shown in Fig. 1, when the driver descends to drive the nail positioned in the throat, the throat being returned to its position in the line of drive by means of the spring pressed plug 57 and the positively operated cam lever 60. It is thus insured that the throat will be returned into the line of drive before the driver descends so as to obviate breaking of the driver. During the operation of the machine the throat is moved into and out of alinement with the driver and with the string nail guide. The cutter also operates to move the string nail guide to place the groove therein in alinement with the throat, and in the actual operation both the throat and the nail guide move simultaneously toward and from each other. The cutter engages the top face of the throat and is then moved to the right Figs. 1 and 4 to cut the last nail from the string. In Fig. 4 the parts are shown in position just after the nail has been severed. The cutter is now under tension and bears not only with considerable force against the string nail guide, but also upon the upper face of the throat. The driver passage is wider at the top than the head of the nail so as to permit the lowermost nail to start to feed into the throat as the throat and string nail move into coöperative position. If now the throat is moved back to position while the cutter bears thereon the nail positioned in the throat is liable to become misplaced by the cutter, thus causing breakage of the driver.

In accordance with this invention the eccentric 88 and the cam 110 are so constructed and so positioned relatively on the drive shaft and with respect to their fork and cam roll, that the pressure of the cutter on the upper face of the throat will be relieved before the throat starts to swing back into alinement with the driver. This is shown in Fig. 4. In this figure the eccentric 88 is at dead center with respect to its fork and is ready to start to move the lever 84 clockwise. The cam 110 is however, at this time in full engagement with its cam roll 109 and will remain in engagement therewith while the drive shaft turns through a short arc. The lever 84 will therefore be swung on its pivot for a short distance in a clockwise direction before the awl begins to move to the right and before the throat begins to move back to its position in alinement with the driver.

The pressure of the cutter on the throat and on the head of the nail in the driver passage is thus relieved before this throat starts to move back into alinement with the driver. The parts are so arranged as to raise and retract the cutter a short distance from the upper face of the throat before the throat starts to move back. As the pressure of the cutter is thus relieved, this cutter will not bear upon the head of the nail in the throat, so that this nail is not displaced when the throat is moved back into alinement with the driver.

The guide member or block 91 is pivoted at its upper end by the screw 92 which passes through an elongated slot in the guide member as shown in Fig. 5. The fin 93 is formed as shown in Figs. 5 and 18 to 21 inclusive, with an upper inclined portion 130, an intermediate substantially vertical portion 131, and a lower inclined portion 132, forming together a series of steps. The throat body is provided with a shoulder 133 forming an abutment for the head of the plug 95. The guide member can be readily removed by removing the screw 92 when the guide member can be pushed downwardly out of its channel. The shoulder 133 limits the movement of the plug when the guide member is removed. The fin and the spring plug, the spring of which is comparatively strong, operate to retain the guide member in position in the throat even when the pivot pin or screw 92 is removed.

The guide member 91 is arranged to move toward and from the opposite throat wall at both ends, since the lower end is free and the upper end has a loose connection with its pivot 92, and since the plug 95 bears against this guide member at a point intermediate its pivotal connection and its free end. The construction of the fin is such that it will constantly and at all times bear against two separated points of the head side of the string nail during the entire passage of this nail through the driver passage, and this engagement is at the head and a point on the shank of the nail. The nail will thus be held firmly with its flat and straight side against the straight vertical wall of the driver passage. The nail is thus supported against transverse movement during its entire passage through the throat and while it is being driven by the driver. This results in a uniform drive and prevents the nail from turning, bending or curling while passing into and through the material. This is due to the fact that the nail is always supported at a plurality of separated points, and at its head as well as at its point or shank.

In Figs. 16 and 17 is illustrated the operation of cutting a nail from the string or fastener stock. As the lowermost nail 134 from the string 135 is fed into the throat, the angular displacement of the throat with respect to the string nail guide will cause a bend 136 in the string between the lowermost nail and the next one 137 above it and at a point just above the head of the lowermost nail 134. The formation of this bend is important as will hereinafter appear. The bend 136 formed as described above is however curved too much and on too long an arc to be useful and must be partially straightened out; this is accomplished as hereinafter described. As the cutter moves against the die 97, the lowermost nail is severed from the string and the bend 136 will be partially straightened out by the pressure of the cutter bearing against the nail 137 and against the guide 65, which guide is sustained by the spring 71 which is comparatively strong. While the nail 137 has its bent portion partially straightened, the extreme end will remain slightly turned as shown in Figs. 17 and 24. This turn will be even slightly more abrupt than the bend 136, due to the straightening action of the cutter and in part due to the action of the beveled and undercut cutting edge of the die on the string. The cutter 78 does not in this case perform the usual operation of a cutter, but operates rather as a die. The actual cutting is performed by the undercut cutting edge of the die 97. The point of the cutter does not dig into the string, but rather operates to clamp the string and form an abutment shearing edge with respect to the edge of the die 97. The bevel face 138 of the cutter is ground off to such an angle that it is substantially parallel with the edge 139 of the nail. The cutter does not therefore dig into the material, but the actual shearing is performed by the die 97 which coöperates with the cutter in finishing the slight turn on the point of the nail. The nail as thus formed will have its point slightly but abruptly turned as shown in Fig. 24. This is important in the utilization of a machine for driving fasteners into leather, since it predetermines the direction of the clench of the nail, and will cause the anvil to clench the point in a predetermined direction as shown in Fig. 4. The anvil used with machines of this type is of the ordinary cup-shaped construction, (in which the cup is a segment of a sphere) but this cup-shaped anvil cannot predetermine or control the direction of the clench with any degree of accuracy, but the point of the nail is liable to turn sidewise and over the anvil so as to come out on the side of the shoe, thus ruining the shoe. However, by forming a turned point on the end of the fastener, this turned point will cause and insure that the nail be clenched in the direction given it by this preliminary turn. The turn given the point of the nail must be slight, and short and comparatively abrupt; otherwise the nail will curl in the leather. Curling of the nail, even in hard leather is further prevented by firmly supporting the nail against transverse or tipping movement while it is being driven, and by forming an awl hole to receive and guide the nail.

Referring now to Figs. 22 and 23, which show a transverse section of a McKay shoe and a section along the seam as formed with this machine, 140 designates the upper, 141 the insole, 142 the outsole, and 143 the tapsole. These parts of the shoe are shown as secured together by means of the metallic nails of fasteners 134. The fasteners are so inserted that the heads 144 thereof will be located in the outsole and the clenched points 145 turned back in to the insole. The fasteners can of course be driven in a channel cut in the outsole and the heads thereof covered by the channel lip. The seam as made with this machine will have the fasteners thereof extending through the outsole, tapsole, upper and insole, with the heads located in the outsole and the clenched points turned back into the insole. These clenched points will extend in a direction along the seam, and it is possible to accurately clench the points in such a direction in view of the fact that the machine predetermines the direction of the clench. The heads of the fasteners do not restrict free expansion or contraction of the fibers of the outsole when the sole is flexed. The clenched points of the fasteners extend in the same direction and along the seam, this will further enhance the flexibility of the sole and cause the flexure to be uniform along the sole. The sole made in accordance with this invention is therefore flexible in view of the fact that free expansion and contraction of the fibers is permitted when the sole is flexed. Furthermore the inside surface of the inside is left perfectly smooth so that no socksole is required.

It is obvious that various changes may be made in the details of construction without departing from this invention, and it is therefore to be understood that this invention is not to be limited to the specific construction shown and described.

The construction and arrangement of the cutter and throat is claimed in applications of Stephen A. Dobyne, Serial Nos. 684,653 and 774,379, filed March 18, 1912, and June 18, 1913, respectively. The novel seam and the method of making the same is claimed in our U. S. Patents Nos. 1,072,211 and 1,072,212, issued Sept. 2, 1913.

Having thus described the invention what is claimed is:

1. In a fastener inserting machine, the combination of a throat having a passage to receive a string of nails, a member having a groove through which said nails pass, a rocking member, an arm carried by said rocking member, a blade carried by said arm and adapted to feed the nails from said groove into said passage, and a member secured to said throat and having a notch adjacent one end of said passage, said blade having a beveled edge adapted to move across said notch and to separate the nails.

2. In a fastener inserting machine, the combination of a throat having a passage to receive a string of nails, a member having a groove through which said nails pass, a rocking member, an arm carried by said rocking member, a blade carried by said arm and adapted to feed the nails from said groove into said passage, a member secured to said throat and having a notch adjacent one end of said passage, and a detent adapted to prevent the backward movement of the nails in said groove, said blade having a beveled edge adapted to move across said notch and to separate the nails.

3. In a fastener inserting machine, in combination with a guide for receiving a string of nails, and a throat for receiving the severed nails, a member for moving the string through the guide to feed the outermost of the nails into the throat, and means for moving said throat and said feeding member simultaneously toward each other to cause the latter to sever said outermost nail from the adjacent nail.

4. In a fastener inserting machine, in combination with means for holding a string of nails, a throat adapted to receive the outermost nail of the string, a member for severing said outermost nail from the adjacent nail, and means for causing said throat and severing member to synchronously approach each other to effect such severance.

5. In a fastener inserting machine, the combination of a nail guiding throat, a guide for fastener stock, a cutting member, and means for moving both said throat and cutting member toward and from each other to cut off a fastener from the stock fed in said throat.

6. In a fastener inserting machine, the combination of a nail guiding throat, a guide for fastener stock, a cutting member, means for moving said throat and guide into coöperative relation to permit the fastener stock to be fed into the throat, and means for moving both said throat and cutting member toward and from each other to cut off a fastener from the stock fed in said throat.

7. In a fastener inserting machine, the combination of a nail guiding throat, a guide for fastener stock, a feeding and cutting member adapted to feed the fastener stock into the throat, and means for moving both said member and throat toward and from each other to cut a fastener from the stock fed in said throat.

8. In a fastener inserting machine, the combination with a frame and a driver thereon, of a guide for a string of connected nails, a movable nail guiding throat, feeding and cutting means constructed and arranged to engage the head of a nail on the string and feed the string into said throat, and coöperate with said throat to cut the string to position a cut nail in said throat, a work feeding awl, and means for moving said throat and awl alternately into the line of drive.

9. In a fastener inserting machine, the combination with a frame and a driver thereon, of a guide for a string of connected nails, a movable nail receiving member, feeding and cutting means constructed and arranged to engage the head of a nail on the string and feed the string into said nail receiving member, and constructed and arranged to coöperate with said nail receiving member to cut the string to position a cut nail in said nail receiving member, means for moving said nail receiving member to position the nail therein in the line of drive, and work feeding and puncturing means including an awl coöperating with said other elements to feed the work and place the puncture formed therein in the line of drive.

10. In a fastener inserting machine, the combination with a frame and a driver thereon, of a guide for a string of connected nails, a movable nail guiding throat, feeding and cutting means constructed and arranged to engage the head of a nail on the string and feed the string into said throat, and coöperate with said throat to cut the string to position a cut nail in said throat, and a work feeding awl coöperating with said throat to feed the work and place the puncture formed therein in alinement with said throat and driver.

11. In a fastener inserting machine, the combination with a frame and a driver thereon, of a guide for a string of connected nails, a movable nail guiding throat, a feeding and cutting member constructed and arranged to engage the head of a nail on the string and feed the string into said throat, and coöperate with said throat to position a cut nail in said throat, a work feeding awl, and means for moving said throat and awl alternately into and out of alinement with said driver.

12. In a fastener inserting machine, the combination with a frame, a driver and a guide for fastener stock thereon, of a movable throat, awl mechanism, means for causing said awl mechanism to engage and move said throat, and a feeding and cutting member adapted to feed the fastener stock into the throat and coöperate therewith to cut a fastener from the stock.

13. In a machine of the class described, the combination with a frame and a driver thereon, of a throat pivotally mounted on said frame, and a guide for fastener stock pivoted on said frame concentric with said throat and movable relatively thereto.

14. In a machine of the class described, the combination with a frame and a driver thereon, of a throat mounted on said frame to swing into and out of alinement with said driver, a guide for fastener stock extending adjacent the upper face of said throat, and means for mounting said guide concentric with said throat.

15. In a machine of the class described, the combination with a frame and a driver thereon, of a throat mounted on said frame to swing into and out of alinement with said driver and having its upper face on the arc of a circle concentric with the pivot of said throat, a guide for fastener stock, and a cutting member coöperating with the upper face of said throat.

16. In a machine of the class described, the combination with a frame and a driver thereon, of a throat pivotally mounted on said frame, and a guide for fastener stock mounted on said frame and extending adjacent the upper face of said throat, the upper face of said throat being curved on the arc of a circle having the pivot of said guide as a center.

17. In a machine of the class described, the combination with a frame and a driver thereon, of a throat pivotally mounted on said frame for movement into and out of alinement with said driver, a guide for fastener stock mounted on said frame and extending adjacent the upper face of said throat, the upper face of said throat being curved on the arc of a circle having the pivot of said guide as a center, and a cutting member coöperating with said guide and said throat.

18. In a machine of the class described, the combination with a frame and a driver thereon, of a throat pivotally mounted on said frame, a guide for fastener stock pivoted on said frame concentric with said throat and movable relatively thereto, and a feeding and cutting member coöperating with said guide and said throat.

19. In a machine of the class described, the combination with a frame and a driver thereon, of a throat pivotally mounted on said frame and having its axis of movement at right angles to said driver, a guide for fastener stock, means for positively moving said throat out of alinement with said driver and into alinement with said guide, and for positively returning said throat into alinement with said driver, and a work feeding awl movable into and out of alinement with said driver.

20. In a machine of the class described, the combination with a frame and a driver thereon, of a throat movably mounted on said frame, a guide for a string of nails, a feeding and cutting member constructed to feed said string into said throat and constructed to coöperate with said throat to cut a nail from said string, and positive means for moving said throat alternately into alinement with said guide and with said driver.

21. In a machine of the class described, the combination with a frame and a driver thereon, of a throat and a guide for fastener stock, a shaft for said throat having a bearing in said frame, and a bearing for said guide on said throat.

22. In a machine of the class described, the combination with a frame and a driver thereon, of a throat and a guide for fastener stock, a shaft for said throat having a bearing in said frame, and an ear on said guide having a bearing on said throat.

23. In a machine of the class described, the combination with a frame and a driver thereon, of a throat pivotally mounted on said frame, and a guide for fastener stock pivoted on said throat.

24. In a machine of the class described, the combination with a frame and a driver thereon, of a throat and a guide for fastener stock, a shaft for said throat having a bearing in said frame, an ear on said guide, and a lug on said ear having a bearing in said shaft.

25. In a machine of the class described, the combination with a frame and a driver thereon, of a throat pivotally mounted on said frame, a guide for fastener stock pivoted on said throat, and a driver guide mounted on said frame and extending adjacent said throat and said guide.

26. In a machine of the class described, the combination with a frame and a driver thereon, of a throat pivotally mounted on said frame, a driver guide mounted in said frame and extending adjacent said throat, and a guide for fastener stock having an ear extending behind said driver guide and pivoted on said throat.

27. In a machine of the class described, the combination with a frame and a driver thereon, of a throat and a shaft therefor having a bearing in said frame constructed to support said throat for swinging movement in a fixed plane, an arm on said shaft, and a cam actuated lever connected to said arm and constructed to rock said shaft to swing said throat.

28. In a machine of the class described, the combination with a frame and a driver thereon, of a throat and a shaft therefor having a bearing in said frame constructed to support said throat for swinging movement in a fixed plane, an arm on said shaft, and a cam for actuating said arm to rock said shaft and swing said throat.

29. In a machine of the class described, the combination with a frame and a driver thereon, of a throat and a supporting shaft therefor, spaced bearings on said frame for said shaft constructed to support said shaft against endwise movement, and an arm on said shaft between said bearings.

30. In a machine of the class described, the combination with a frame and a driver and a throat thereon, of a guide for a string of nails movably supported on said frame, a feeding and cutting member, and a spring for supporting said guide against the action of said feeding and cutting member.

31. In a machine of the class described, the combination with a frame and a driver and a throat thereon, of a guide for a string of nails movably supported on said frame, a feeding and cutting member adapted to move along said guide to feed said string into said throat and to coöperate with said throat to cut a nail from said string, and a spring for supporting said guide against the action of said feeding and cutting member.

32. In a machine of the class described, the combination with a frame and a driver and a throat thereon, of a guide for a string of nails movably supported on said frame and extending adjacent the upper face of said throat, a feeding and cutting member adapted to move along said guide to feed said string into said throat and to coöperate with the upper face of said throat to cut a nail from said string, and a spring for supporting said guide against the action of said feeding and cutting member.

33. In a machine of the class described, the combination of a frame and a driver thereon, of a throat mounted on said frame for movement into and out of alinement with said driver, a guide for a string of nails movably supported on said frame, a feeding and cutting member, and a spring for supporting said guide against the action of said feeding and cutting member.

34. In a machine of the class described, the combination with a frame and a driver thereon, of a throat having a cutting die at its upper face, a guide for a string of nails mounted on said frame and extending adjacent said face, a feeding and cutting member coöperating with said guide and said die, and a spring for supporting said guide against the action of said feeding and cutting member.

35. In a machine of the class described, the combination with a frame and a driver thereon, of a throat movable into and out of alinement with said driver and having a cutting die at its upper face, a guide for a string of nails mounted on said frame and extending adjacent said face, and a feeding and cutting member coöperating with said guide and said die.

36. In a machine of the class described, the combination with a frame and a driver thereon, of a throat movable into and out of alinement with said driver and having a cutting die at its upper face, a guide for a string of nails mounted on said frame and extending adjacent said face, a feeding and cutting member coöperating with said guide and said die, and a spring for supporting said guide against the action of said feeding and cutting member.

37. In a machine of the class described, the combination with a frame and a driver thereon, of a nail guiding throat coöperating with said driver, a guide for a string of nails mounted on said frame, a cutting member, and means for yieldingly supporting said guide against the action of said cutting member constructed to support the string between said guide and said cutting member at the cutting point while said cutting member operates to cut a nail from the string.

38. In a machine of the class described, the combination with a frame and a driver thereon, of a nail guiding throat coöperating with said driver, a guide for a string of nails mounted on said frame, and a cutting member operating to cut a nail from the string, said cutting member and said guide being constructed to support and clamp the string therebetween and at the cutting point while said cutting member operates to cut a nail from the string.

39. In a machine of the class described, the combination with a frame and a driver thereon, of a nail guiding throat coöperating with said driver, a guide for a string of nails mounted on said frame, and a cutting member coöperating with said throat to cut a nail from the string, said cutting member and said guide being constructed to support and clamp the string therebetween and at the cutting point while said cutting member coöperates with said throat to cut a nail from the string.

40. In a machine of the class described, a member having a guide for a string of connected headed nails, and a guard coöperating with said guide, said guard having nail engaging portions of different lengths and adjustable to place any one of said portions in operative position.

41. In a machine of the class described, a member having a guide for a string of connected headed nails, and a guard pivoted on said member and adjustable transversely thereon for nails of different lengths.

42. In a machine of the class described, a frame, fastener forming and inserting mechanism mounted on said frame, means for supporting a plurality of strips of fastener stock on said frame, and clips on said frame for receiving and retaining the free ends of said strips when not in use.

43. In a machine of the class described, the combination of a frame, a drive shaft thereon, bearings above and below said shaft, a driver bar in said bearings, a crank on said shaft, and a pitman directly connecting said driver bar and said crank.

44. In a machine of the class described, the combination of a frame, a drive shaft thereon, bearings above and below said shaft, a driver bar in said bearings and to one side of said shaft, a crank on said shaft, and a pitman connected to said crank, and directly connected to the upper end of said driver bar.

45. In a machine of the class described, the combination of a frame, a drive shaft thereon, bearings above and below said shaft, a driver bar in said bearings and to one side of said shaft, a forwardly extending head on the upper end of said driver bar, a crank on said shaft and in front of said driver bar, and a pitman directly connecting said crank and said head.

46. In a machine of the class described, the combination of a frame, a drive shaft thereon, bearings above and below said shaft, a driver bar in said bearings, a head on the upper end of said driver bar, a guide on said frame engaging said head, a crank on said shaft, and a pitman connecting said crank and said head.

47. In a machine of the class described, the combination of a frame, a drive shaft thereon, bearings above and below said shaft, a driver bar in said bearings, a guide bar on said frame, a head on the upper end of said driver bar having a part embracing said guide bar and having a bearing, a crank on said shaft, and a pitman connecting said crank and the bearing on said head.

48. In a machine of the class described, the combination of a frame, a drive shaft thereon, bearings above and below said shaft, a driver bar in said bearings, a crank on said shaft, a pitman directly connecting said driver bar and said crank, and means for adjusting said driver bar with respect to said crank.

49. In machine of the class described, the combination of a frame, a drive shaft thereon, bearings above and below said shaft, a driver bar in said bearings, a crank on said shaft, a pitman directly connecting said driver bar and said crank, and an adjustable member mounted on said pitman and engaging one of said members connected therewith.

50. In a machine of the class described having a removable driver, a driver guide comprising a slotted support, and a removable guide sleeve on said support.

51. In a machine of the class described having a removable driver, a driver guide comprising a removable sleeve bored to the diameter of the driver and slotted at its end to provide an angular portion for the driver.

52. In a machine of the class described having a removable driver, a driver guide comprising a support, a sleeve removably mounted in said support, and a screw in said support having a head for engaging and clamping said sleeve.

53. In a machine of the class described, the combination of a drive shaft having cams thereon, an awl carrier mounted to swing to pierce the work and slide to feed the work, and two levers, one constructed to swing said carrier and the other constructed to slide said carrier, said levers being operated positively in both directions from said cams.

54. In a machine of the class described, the combination of a frame having a bearing therein, an awl carrier mounted to swing and slide in said bearing, and a shank screwed in said carrier and having a head thereon engaging said frame.

55. In a machine of the class described, the combination of a frame having a bearing therein, an awl carrier mounted to swing and slide in said bearing, a shank adjustably mounted in said carrier and having an adjustable stop head thereon, and a cushion between said head and said frame.

56. In a machine of the class described, the combination of a frame having a bearing therein, an awl carrier mounted to swing and slide in said bearing, a shank adjustably mounted in said carrier and having an adjustable stop head thereon, and a latch on said frame engaging said head and permitting sliding movement thereof with said carrier.

57. In a machine of the class described, the combination of a frame having a bearing therein, an awl carrier mounted to swing and slide in said bearing, a shank screwed in said carrier and having a head engaging said frame, and a spring in said bearing between said carrier and said bearing.

58. In a machine of the class described, the combination of a frame having a bearing therein, an awl carrier mounted to swing and slide in said bearing, a shank screwed in said carrier and having a head engaging said frame, an actuator, and a screw in said carrier engaged by said actuator.

59. In a machine of the class described, the combination of a frame, an awl carrier having an awl and mounted in said frame to swing to pierce the work and slide to feed the work, means for adjusting the feeding stroke of said carrier, and means for adjusting said carrier constructed to adjust the position of the awl in the line of drive.

60. In a machine of the class described, the combination of a frame, an awl carrier having an awl and mounted in said frame to swing to pierce the work and slide to feed the work, a lever adapted to engage the carrier to slide the same, a stop for limiting the return movement of said carrier, and means for adjusting said carrier and lever relatively constructed to adjust the position of the awl in the line of drive.

61. In a machine of the class described, the combination of a frame, an awl carrier having an awl and mounted in said frame to swing to pierce the work and slide to feed the work, a lever adapted to engage the carrier to slide the same, a stop for limiting the return movement of said carrier, and an abutment on said carrier engaged by said lever and adjustable to adjust the position of the awl in the line of drive.

62. In a machine of the class described, the combination with fastener guiding, inserting and clenching means, of means for deflecting the point on a fastener with respect to its shank so as to predetermine the direction of its clench by the clenching means.

63. In a machine of the class described, the combination with fastener inserting means, work supporting and feeding means, and clenching means, of fastener guiding and presenting means constructed and arranged to present a fastener having a laterally extending head to the work with its head extending in a direction along the line of feed of the work, and means operating on the fastener prior to the operation of the clenching means thereon for insuring the clench of said fastener by said clenching means in the direction of its laterally extending head.

64. In a machine of the class described, the combination with fastener inserting means, work supporting and feeding means, and clenching means, of fastener guiding and presenting means constructed and arranged to present a fastener to the work, and means operating on the fastener prior to the operation of the clenching means thereon for insuring the clench of the point of the fastener in a predetermined direction along the line of feed of the work.

65. In a machine of the class described, the combination with fastener guiding and inserting means, work feeding means, and clenching means, of means for forming a point on a fastener in such a way as to predetermine the direction of its clench by the clenching means along the line of feed of the work.

66. In a machine of the class described, the combination with fastener guiding and inserting means, work feeding means, and clenching means, of means for deflecting the point of a fastener in a direction along the line of feed of the work so as to cause the clenching means to clench the deflected point in a direction along the line of feed.

67. In a machine of the class described, the combination with fastener guiding and inserting means, and clenching means, of means for bending the point of a fastener in such a way as to predetermine the direction of its clench.

68. In a machine of the class described, the combination with fastener guiding, inserting and clenching means, of means for deflecting the point on a fastener to predetermine the direction of its clench by the clenching means, and an awl constructed and arranged to form a hole to receive the fastener.

69. In a machine of the class described, the combination with fastener inserting means, of a throat coöperating therewith, a fastener stock guide, means for forming a bend in the fastener stock, and means for severing the fastener stock, said means being constructed and arranged to position in said throat and in operative relation with respect to said fastener inserting means, a fastener having a bent point.

70. In a machine of the class described, the combination with fastener inserting means, of a throat coöperating therewith, a fastener stock guide, means for forming a bend in the fastener stock, and means for severing the fastener stock adjacent the bend, said means being constructed and arranged to position in said throat and in operative relation with respect to said fastener inserting means, a fastener having a bent point.

71. In a machine of the class described, the combination with a fastener inserting means, of a throat coöperating therewith, a fastener stock guide, means for moving said throat and guide into angular relation to form a bend in the fastener stock and for cutting the fastener stock to position in the throat and in operative relation with respect to said fastener inserting means, a fastener having a bent point.

72. In a machine of the class described, the combination with fastener inserting means, of a throat coöperating therewith, a fastener stock guide, means for moving said throat and guide into angular relation to form a bend in the fastener stock, and a cutter coöperating with said parts to cut the stock and position in the throat and in operative relation with respect to said fastener inserting means, a fastener having a bent point.

73. In a machine of the class described, the combination with clenching means, of means for abruptly bending the point on a fastener with respect to its shank so as to predetermine the direction of its clench by the clenching means, and for presenting the fastener to the work, and means for driving the fastener through the work.

74. In a machine of the class described, the combination with work feeding means and clenching means, of means for abruptly bending the point on a fastener with respect to its shank so as to predetermine the direction of its clench by the clenching means, and for presenting the fastener to the work with its point bent along the line of feed of the work, and means for driving the fastener through the work.

In testimony whereof we affix our signatures in presence of two witnesses.

GEORGE A. DOBYNE.
STEPHEN A. DOBYNE.

Witnesses:
W. W. NUNN,
E. O. SCHLOSSER.

Copies of this patent may be obtained for five cents each, by addressing the "Commissioner of Patents, Washington, D. C."